United States Patent
Osaka et al.

(10) Patent No.: US 8,724,021 B2
(45) Date of Patent: May 13, 2014

(54) PORTABLE ELECTRONIC DEVICE

(75) Inventors: Masashi Osaka, Yokohama (JP); Shouji Suzuki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 7 days.

(21) Appl. No.: 13/574,852

(22) PCT Filed: Jan. 25, 2011

(86) PCT No.: PCT/JP2011/051357
§ 371 (c)(1),
(2), (4) Date: Jul. 24, 2012

(87) PCT Pub. No.: WO2011/093287
PCT Pub. Date: Aug. 4, 2011

(65) Prior Publication Data
US 2012/0293683 A1 Nov. 22, 2012

(30) Foreign Application Priority Data

Jan. 26, 2010 (JP) ................................. 2010-014408

(51) Int. Cl.
*H04N 5/225* (2006.01)
*H04N 7/00* (2011.01)

(52) U.S. Cl.
USPC ............. 348/376; 348/222.1; 348/36; 348/37

(58) Field of Classification Search
None
See application file for complete search history.

(56) References Cited

U.S. PATENT DOCUMENTS 5,045,872 A * 9/1991 Yoshimura et al. ............. 396/20
5,128,770 A   7/1992 Inana et al.
6,304,284 B1 * 10/2001 Dunton et al. ................... 348/36
7,558,475 B2 * 7/2009 Wakabayashi ................ 396/287
2009/0185056 A1 * 7/2009 Okamoto et al. ........ 348/240.99
2010/0157053 A1 * 6/2010 Helmes ......................... 348/143

FOREIGN PATENT DOCUMENTS

| JP | 1258566 A | 10/1989 |
|---|---|---|
| JP | 1279678 A | 11/1989 |
| JP | 2024675 U | 2/1990 |
| JP | 2000147643 A | 5/2000 |
| JP | 2002016909 A | 1/2002 |
| JP | 2006128894 A | 5/2006 |
| JP | 2006191524 A | 7/2006 |
| JP | 2007049362 A | 2/2007 |
| JP | 2007267063 A | 10/2007 |
| JP | 2008294712 A | 12/2008 |
| JP | 2009171268 A | 7/2009 |
| JP | 2009224918 A | 10/2009 |

OTHER PUBLICATIONS

International Search Report and Written Opinion for PCT/JP2011/051357, dated Mar. 8, 2011.

* cited by examiner

*Primary Examiner* — Twyler Haskins
*Assistant Examiner* — Angel L Garces-Rivera
(74) *Attorney, Agent, or Firm* — Lowe Hauptman & Ham, LLP

(57) ABSTRACT

According to an aspect, a portable electronic device includes an imaging unit, a moving unit, and a control unit. The imaging unit images a subject in an imaging region. The moving unit changes orientation and/or a position of the portable electronic device. The control unit causes the moving unit to change the orientation and/or the position of the portable electronic device so as to move the imaging region of the imaging unit.

10 Claims, 6 Drawing Sheets

PORTABLE ELECTRONIC DEVICE

RELATED APPLICATIONS

This application is a National Stage of PCT international application Ser. No. PCT/JP2011/051357 filed on Jan. 25, 2011 which designates the United States, and which is based upon and claims the benefit of priority from Japanese Patent Application No. 2010-014408, filed on Jan. 26, 2010.

FIELD

The present disclosure relates to a portable electronic device including an imaging unit that takes images.

BACKGROUND

Examples of portable electronic devices including an imaging unit that takes images include cameras that take still images and video cameras that take moving images. In recent years, there are also mobile phones in which an imaging unit is mounted.

Various methods have been proposed as imaging methods for portable electronic devices that takes images. For example, devices disclosed in Patent Literatures 1 and 2 are proposed as devices having a panoramic photography function for taking images that are wider than images of standard sizes.

Patent Literature 1 discloses a device that includes a camera for taking images, a platform device for rotating the camera for taking images to move the line of sight of the camera in the horizontal direction and in the vertical direction and set the camera to a predetermined position, and a processing device that remotely controls the platform device, and that takes images while moving the imaging direction of the camera for taking images by the platform device and integrates the taken images by the processing device to form a panoramic image. Patent Literature 2 also discloses a platform for supporting an imaging device.

CITATION LIST

Patent Literatures

Patent Literature 1: Japanese Patent Application Laid-Open No. 2002-016909
Patent Literature 2: Japanese Patent Application Laid-Open No. 2000-147643

TECHNICAL PROBLEM

As described in Patent Literatures 1 and 2, it is possible to take an image having an angle wider (a range wider) than a viewing angle of the imaging unit by providing a dedicated platform and taking images while changing the orientation and/or the position of the camera.

The devices disclosed in Patent Literatures 1 and 2, however, require rails or the like for guiding the imaging devices, which makes the devices large in size. Although the devices disclosed in Patent Literatures 1 and 2 are basically assumed to be installed at predetermined positions for a long time and are not assumed to be carried around, portable electronic devices to be carried having a large size are inconvenient for carrying around. If images are taken while the imaging direction and/or the position are changed manually, this causes image blurring and makes it difficult to take images that are easy to be integrated.

For the foregoing reasons, there is a need for a portable electronic device capable of taking images of a region to be imaged or an object to be imaged according to the purpose with a simple configuration.

SUMMARY

According to an aspect, a portable electronic device includes: a housing; an imaging unit mounted in the housing for imaging a subject in an imaging region; a displacing unit mounted in the housing for displacing a position of the housing; and a control unit for causing the displacing unit to move the position of the housing so as to move the imaging region of the imaging unit.

According to another aspect, the displacing unit is a rotating unit that rotates the housing around a rotary axis along a direction perpendicular to a surface on which the housing is placed.

According to another aspect, the rotating unit rotates a rotor to rotate the housing.

According to another aspect, the rotating unit also serves as an informing unit for performing information by rotating the rotor to vibrate the housing, and the control unit performs the information by reversing the rotating direction of the rotor.

According to another aspect, the portable electronic device further includes a communication unit for communicating with another device. The control unit rotates the rotor to operate an informing function by the informing unit when an incoming call is received by the communication unit.

According to another aspect, the housing further includes a projecting portion on a first main face to be opposed to the surface on which the housing is place, and the projecting portion is a center of rotation when the housing is rotated.

According to another aspect, the housing further includes a sound emitting unit for outputting sound, and the sound emitting unit is arranged at a position facing a space between the surface on which the housing is placed and the first main face.

According to another aspect, the portable electronic device further includes an attitude detecting sensor for detecting an attitude of the housing. The control unit causes the displacing unit to displace the housing on the basis of the attitude of the housing detected by the attitude detecting sensor.

According to another aspect, the control unit causes the imaging unit to image a plurality of images while causing the displacing unit to rotate the housing, and combines the taken images to obtain an image wider than the imaging region.

According to another aspect, the portable electronic device further includes a storage unit for storing an image taken by the imaging unit. The control unit extracts a subject from the image taken by the imaging unit, and stores the image taken by the imaging unit when the extracted subject includes a predetermined specific subject.

According to another aspect, the control unit causes the displacing unit to displace the housing on the basis of a position of the specific subject in the imaging region.

According to another aspect, the control unit causes the displacing unit to displace the housing and takes an image of a region satisfying a predetermined condition.

According to another aspect, the portable electronic device further includes a recording unit capable of obtaining directivity of sound and recording the sound. The control unit causes the displacing unit to displace the housing in a direction in which a direction of an output source of the sound obtained by the recording unit is contained in the imaging region of the imaging unit, and performs imaging by the imaging unit.

ADVANTAGEOUS EFFECTS OF INVENTION

A portable electronic device according to the present invention has an advantageous effect of being capable of taking images of a region to be imaged or an object to be imaged according to the purpose with a simple configuration.

DESCRIPTION OF EMBODIMENTS

The present invention will be described in detail below with reference to the drawings. The present invention is not limited to the description below. Components in the description below encompass some components that are easily conceived by those skilled in the art, that are substantially identical, or that fall into so-called equivalent ranges. While a mobile phone will be described as an example of the portable electronic device in the following description, the application of the present invention is not limited to mobile phones but the present invention may also be applied to PHSs (personal handy-phone systems), PDAs, portable navigation devices, laptop computers and game machines, for example.

Figure 1:
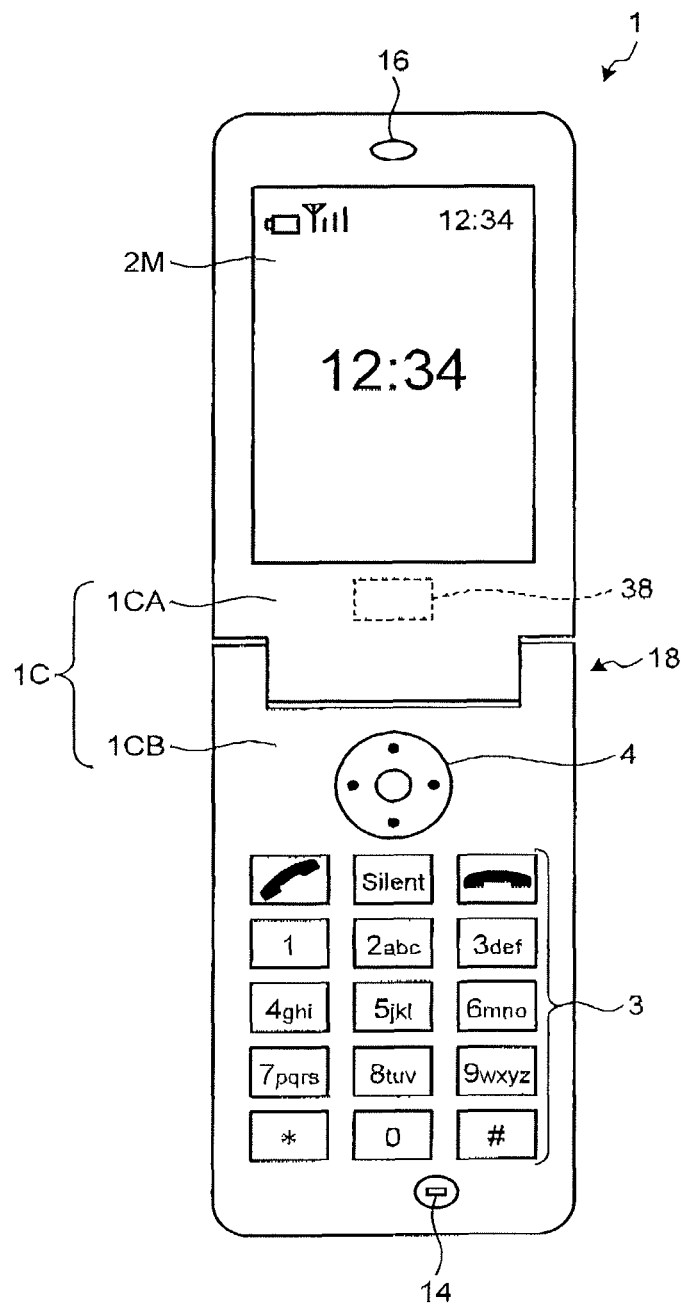
FIG. 1 is a plan view illustrating a schematic configuration of an embodiment of a portable electronic device according to the present invention.
Figure 2:
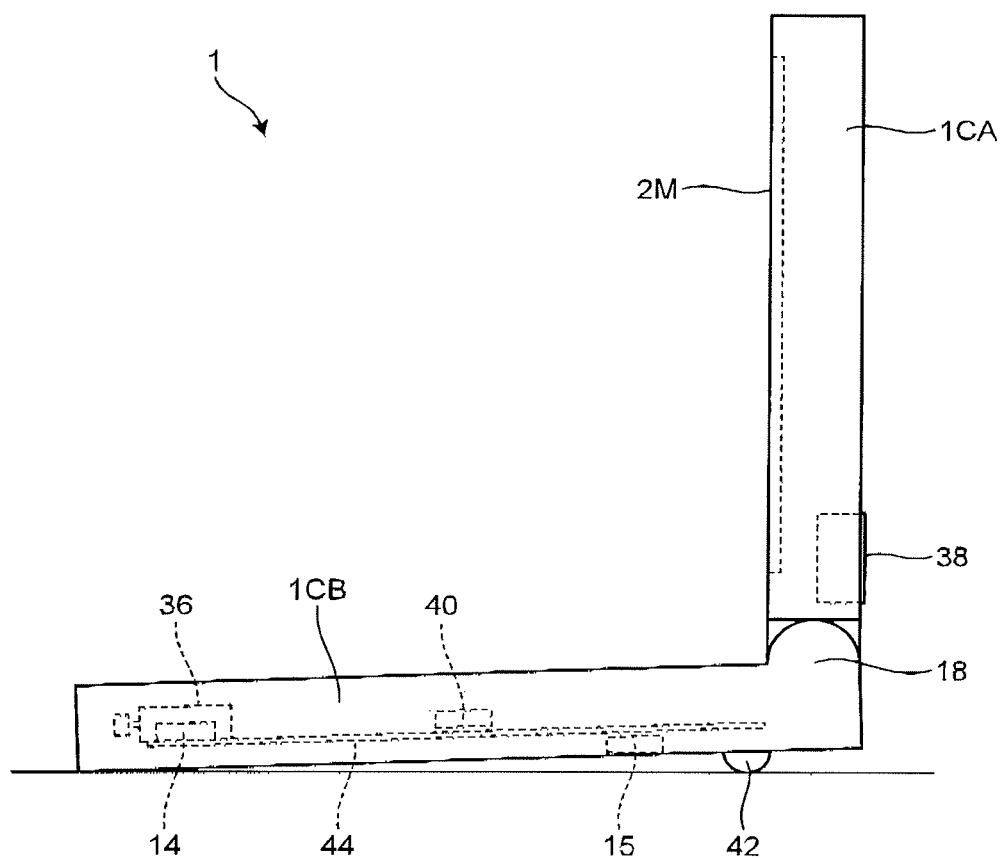
FIG. 2 is a side view illustrating a schematic configuration of the portable electronic device illustrated in FIG. 1 in a form different from that in FIG. 1.
Figure 3:
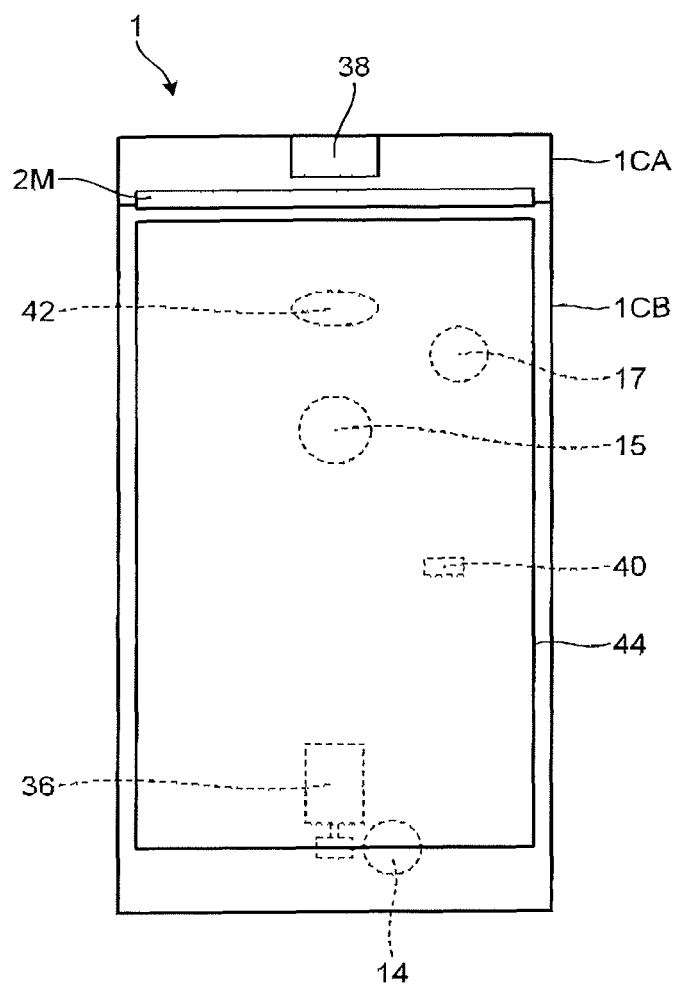
FIG. 3 is a top view of the portable electronic device illustrated in FIG. 2.

First, an external configuration of a portable electronic device and an arrangement of components will be described. FIG. 1 is a plan view illustrating a schematic configuration of an embodiment of the portable electronic device according to the present invention. FIG. 2 is a side view illustrating a schematic configuration of the portable electronic device illustrated in FIG. 1 in a form different from that in FIG. 1, and FIG. 3 is a top view of the portable electronic device illustrated in FIG. 2.

The portable electronic device 1 is a mobile phone having a wireless communication function. The portable electronic device 1 is a folding type mobile phone having a housing 1C including a first housing 1CA and a second housing 1CB with which the housing 1C can be opened and closed. Specifically, the first housing 1CA and the second housing 1CB are coupled by a hinge 18. With this structure, both the first housing 1CA and the second housing 1CB can turn around the hinge 18 in a direction away from each other and in a direction toward each other. The portable electronic device 1 is opened when the first housing 1CA and the second housing 1CB turn in the direction away from each other, while the portable electronic device 1 is closed when the first housing 1CA and the second housing 1CB turn in the direction toward each other. FIG. 1 illustrates a state in which the portable electronic device 1 is opened. FIGS. 2 and 3 illustrate a state in which the first housing 1CA and the second housing 1CB are moved by a given angle in the closing direction from the state illustrated in FIG. 1. In FIGS. 2 and 3, the portable electronic device 1 is placed in a state in which a first main face (a face opposite to a face on which operation keys 3 to be described later are provided; back face) of the second housing 1CB is opposed to a holding surface.

The first housing 1CA is provided with a main display 2M illustrated in FIG. 1 as a display unit. The main display 2M displays, as predetermined images, a standby screen in a state where the portable electronic device 1 is waiting for incoming signals or a menu image to be used for assisting the operation for the portable electronic device 1. The main display 2M is provided on a face facing the second housing 1CB when the housing 1C is closed.

As illustrated in FIG. 1, a receiver 16 that produces sound during a call using the portable electronic device 1 is provided on an end portion of the first housing 1CA opposite to an end portion where the hinge 18 is provided. The first housing 1CA is also provided with a camera 38, and an imaging window is provided in a face thereof opposite to the face on which the main display 2M is provided.

In addition, a plurality of operation keys 3 for inputting telephone numbers of persons to be called or texts to compose a mail message and arrow and enter keys 4 for easily selecting and deciding options from menus displayed on the main display 2M and easily scrolling the viewing area on the screen are provided on a face of the second housing 1CB facing the first housing 1CA when the housing 1C is closed. The operation keys 3 and the arrow and enter keys 4 constitute an operation unit 28 (see FIG. 4) of the portable electronic device 1.

The second housing 1CB is also provided with a main microphone that receives voice and a sub microphone 15 that mainly receives ambient sound during a call using the portable electronic device 1. The main microphone 14 is provided in an end portion of the second housing 1CB opposite to the end portion where the hinge 18 is provided, and the sub microphone 15 is provided nearer to the hinge 18 with respect to the center of the second housing 1CB. A speaker 17 as a sound emitting unit is arranged in the back face of the second housing 1CB. The speaker 17 directly outputs sound such as a ringtone or for a hands-free talk.

A vibration motor 36 is arranged at a position in the second housing 1CB near the end portion of the second housing 1CB opposite to the end portion where the hinge 18 is provided and substantially in the center of the first main face in the short-side direction. The vibration motor 36 is an eccentric motor having an eccentric weight on a rotating shaft that is oriented in a direction passing through a support 42. The vibration motor 36 can also switch the rotating direction of the rotating shaft to rotate the rotating shaft in both directions. In the second housing 1CB, a triaxial sensor 40 that detects the orientation and the position (attitude) of the second housing 1CB is provided.

The support 42 that projects downward (in a direction perpendicular to the back face) from the housing 1C is provided at a position on the side of the hinge 18 of a face (first main face) of the second housing 1CB opposite to the face on which the operation keys 3 are provided and substantially in the center of the first main face in the short-side direction. With this structure, when the portable electronic device 1 is placed on a holding surface as illustrated in FIGS. 2 and 3, the portable electronic device 1 becomes in a state in which the second housing 1CB is in contact with the holding surface at the support 42 and a side of the first main face. The side of the first main face is in contact with a side face opposite to a side face where the hinge 18 is provided. Thus, parts of the second housing 1CB other than the support 42 and the side are at a distance (in non-contact with) the holding surface.

In the second housing 1CB, circuits that constitute a control unit 22, which will be described later, that integrally controls overall operation of the portable electronic device 1 and a board 44 on which control circuits of respective units are provided are placed as illustrated in FIG. 2.

Figure 4:
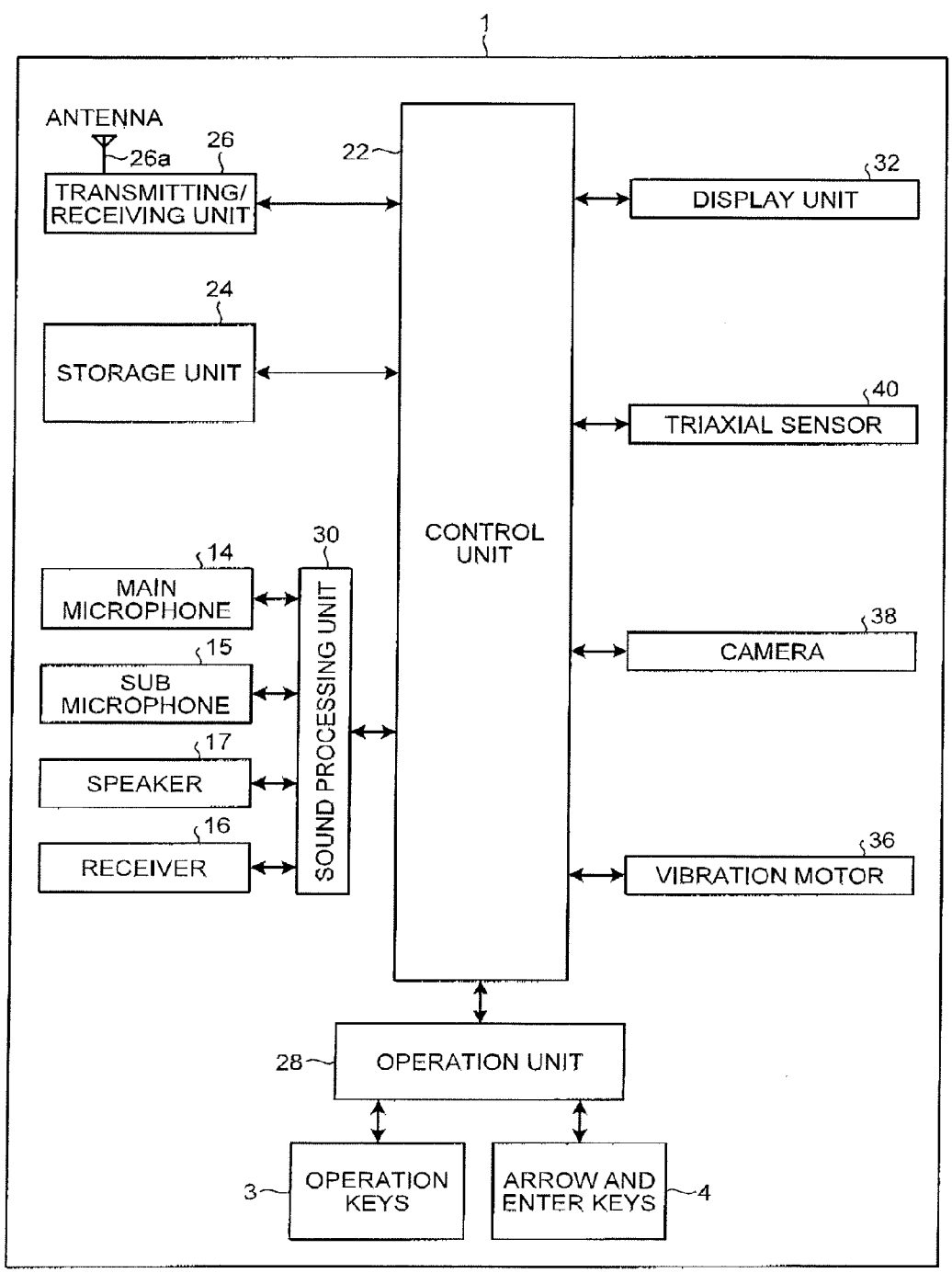
FIG. 4 is a block diagram illustrating a schematic configuration of the portable electronic device according to the present invention.

Functional configuration of the portable electronic device 1 will be described below with reference to FIG. 4. FIG. 4 is a block diagram illustrating a schematic configuration of the portable electronic device according to the present invention. As illustrated in FIG. 4, the portable electronic device 1 includes the control unit 22, a storage unit 24, a transmitting/receiving unit 26, the operation unit 28, a sound processing unit 30, a display unit 32, the vibration motor 36, the camera 38 and the triaxial sensor 40.

The control unit 22 is a processor that integrally controls overall operation of the portable electronic device 1, such as a CPU (central processing unit). Specifically, the control unit 22 controls operation of the transmitting/receiving unit 26, the display unit 32 and the like so that various processes of the portable electronic device 1 are performed by appropriate procedures according to operation of the operation unit 28 and software saved in the storage unit 24 of the portable electronic device 1. The control unit 22 performs processes on the basis of programs (such as operating system programs and application programs) saved in the storage unit 24. The control unit 22 can execute a plurality of programs (applications, software) in parallel.

The storage unit 24 stores therein programs and data of applications to be used for processes in the control unit 22. Specifically, examples of the application programs that are stored include programs of applications for performing communication over the Internet, programs of applications for transmitting/receiving mails, programs of applications for reproducing sound data, programs of applications for processing an incoming call, an outgoing call and a call in progress, and programs of applications for processing one-segment broadcasts. Examples of data include image data, sound data, dictionary data for character conversion, and address book data.

The transmitting/receiving unit (communication unit) 26 includes an antenna 26, and establishes wireless signal path using the CDMA system or the like with base stations through channels assigned by the base stations to perform telephone communication and information communication with the base stations. The transmitting/receiving unit 26 also includes an antenna for receiving television broadcasts and an antenna for receiving GPS signals.

The operation unit 28 is constituted by operation keys to which various functions are assigned such as a power key, a call key, numeric keys, character keys, arrow keys, an enter key and an originating call key, and arrow and enter keys 4. Upon receiving an input by operation of these keys by the user, the operation unit 28 generates signals corresponding to the operation. The generated signals are input as user's instruction to the control unit 22.

The sound processing unit 30 processes sound signals input to the main microphone 14 and the sub microphone 15 and sound signals output from the receiver 16 and the speaker 17.

The display unit 32 includes a display panel (for example, the main display 2M described above) such as an LCD (liquid crystal display) and an organic EL (organic electro-luminescence) panel. The display unit 32 displays video according to video data and images according to image data supplied from the control unit 22 onto the display panel.

The vibration motor 36 is an eccentric motor having an eccentric weight on a rotating shaft. The vibration motor 36 generates vibration by rotating the rotating shaft with the eccentric weight to vibrate the housing 1C (the first housing 1CA and the second housing 1CB). The vibration motor 36 has a function of an informing unit that informs of an incoming call by vibrating the housing 1C without outputting sound for informing of an incoming call. The vibration motor 36 also has a function of a driving unit that rotates the rotating shaft and rotates the eccentric weight to rotate the housing 1C in an arbitrary direction.

The camera 38 is provided on an opposite face with respect to the main display 2M among faces of the first housing 1CA as described above. The camera 38 is an imaging system that captures an image of an imaging region (a region included in the viewing angle that is a certain angle) facing the opposite face. The camera 38 sends the captured image to the control unit 22.

The triaxial sensor 40 is provided inside the second housing 1CB. The triaxial sensor 40 is a sensor that detects accelerations in three directions. The triaxial sensor 40 sends the detected acceleration information to the control unit 22. The control unit 22 detects the attitude of the housing 1C on the basis of the information sent from the triaxial sensor 40. Specifically, the control unit 22 can detect a change (movement) in the orientation and the position of the housing 1C by performing predetermined calculation based on the accelerations in three directions detected by the triaxial sensor 40. In other words, the portable electronic device 1 can realize functions as an attitude detecting sensor that detects the attitude of the housing 1C by some functions of the triaxial sensor 40 and the control unit 22. The control unit 22 can also detect the direction of the action of gravity on the basis of the detection values of the triaxial sensor 40, and can thus detects the vertical direction. The portable electronic device 1 basically has such a configuration as described above.

Figure 5:
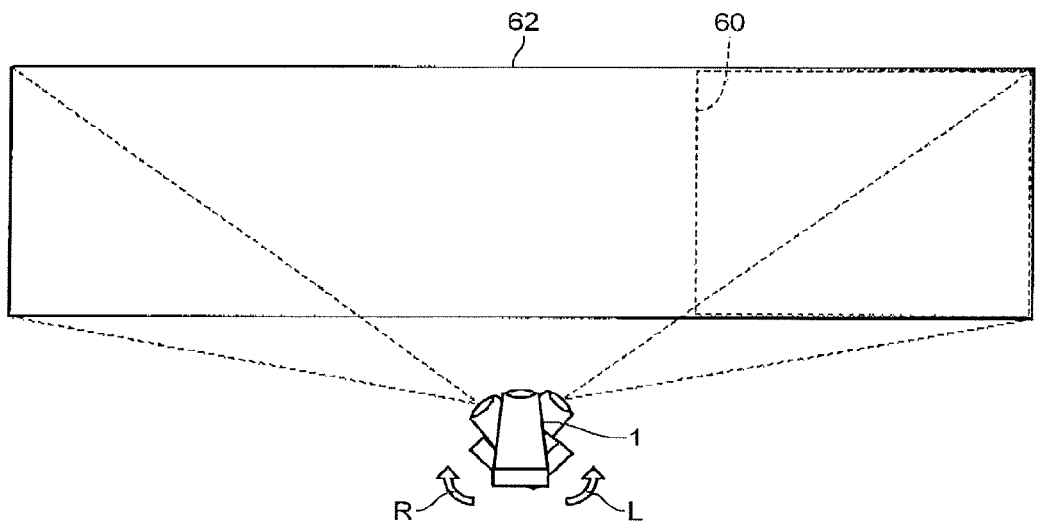
FIG. 5 is a diagram illustrating an example of relation between an attitude of the portable electronic device and a taken image.

Next, operation of the portable electronic device 1 will be described with reference to FIG. 5. FIG. 5 is a diagram illustrating an example of relation between the attitude of the portable electronic device and a taken image. FIG. 5 schematically illustrates the portable electronic device 1 and the camera. First, the portable electronic device 1 can rotate the housing 1C in the direction of a white arrow R by rotating the vibration motor 36 in one direction according to the control by the control unit 22. The portable electronic device 1 can also rotate the housing 1C in a direction of a white arrow L by rotating the vibration motor 36 in the other direction. The housing 1C of the portable electronic device 1 basically rotates about the support 42 as the center of rotation.

The portable electronic device 1 can thus move the imaging region of the camera 38 provided in the first housing 1CA by rotating the housing 1C by the vibration motor 36. The control unit 22 of the portable electronic device 1 performs imaging by the camera 38 a plurality of times while rotating the housing 1C by the vibration motor 36 by using the aforementioned functions.

The control unit 22 also integrates a plurality of taken images. In this process, the control unit 22 calculates the moving amount, that is, the rotating angle and the moving distance of the housing 1C on the basis of the detection results of the triaxial sensor 40. The control unit 22 calculates relative positional relation between the taken images from the positions and the orientations of the housing 1C at imaging by the camera 38 and integrates a plurality of images on the basis of the calculated relative positional relation. As a result, the portable electronic device 1 obtains an image of a region 62 that is wider than an imaging region 60 as illustrated in FIG. 5. That is, the portable electronic device 1 takes a panoramic image.

In this manner, the portable electronic device 1 can obtain an image of a region 62 wider than the imaging region 60 of the camera 38 by taking a plurality of images of different imaging regions by the camera 38 while rotating the housing 1C by the vibration motor 36 and integrating the obtained images.

As a result of rotating the housing 1C by the vibration motor 36, that is, rotating the housing 1C by a driving mechanism, the portable electronic device 1 can also minimize misalignment of imaging regions and an increase/decrease in the rotating speed caused when the housing 1C is manually rotated, thus performing imaging under more stable conditions. Accordingly, imaging can be more easily performed.

As a result of providing a mechanism for moving the housing 1C in the housing 1C, that is, providing the imaging unit and the driving unit in one housing, the portable electronic device 1 can have a simpler device configuration. Furthermore, as a result of using the vibration motor 36 as the driving unit as in the present embodiment, the driving mechanism can have a simple configuration. When the portable electronic device 1 is a mobile phone, a mechanism included as an existing mechanism can be used. Since it is thus not necessary to use an additional driving unit, the device configuration can be made simpler and the device can be made smaller.

The portable electronic device 1 can integrate images accurately by integrating images taken by the camera 38 on the basis of the detection results of the triaxial sensor 40. Specifically, since the control unit 22 of the portable electronic device 1 can determine the positions of the images taken by the camera 38 on the basis of the detection results of the triaxial sensor 40, it is possible to prevent the regions where images are taken from being too far from one another or from overlapping too much.

Since the portable electronic device 1 can integrate images on the basis of positional information even when taking moving images by the camera 38 and integrating the images, it is possible to prevent images of some regions from expanding or shortening as compared with the actual regions. As a result, the portable electronic device 1 can obtain an image that is wider than the imaging region of the camera 38 in a state closer to the actual imaging regions.

As a result of providing the support 42, the portable electronic device 1 can rotate the housing 1C about the support 42. Accordingly, the housing 1C can be rotated about one point, and misalignment in the imaging regions between images taken by the camera 38 can be minimized. Accordingly a more favorable image can be obtained.

As a result of providing the support 42, the portable electronic device 1 can also have the speaker 17 arranged at a predetermined distance from the holding surface. It is thus possible to prevent the speaker 17 from being blocked by the holding surface and to efficiently output sounds from the speaker 17 to outside.

Note that the range imaged by the camera 38 is not particularly limited. For example, an image of all round (360°) the portable electronic device 1 may be obtained by fully rotating the housing 1C by the vibration motor 36. The angle of the imaging region may be 120° or 180°. The angle of the imaging region may be arbitrarily set by the user or may be a predetermined angle.

Figure 6:
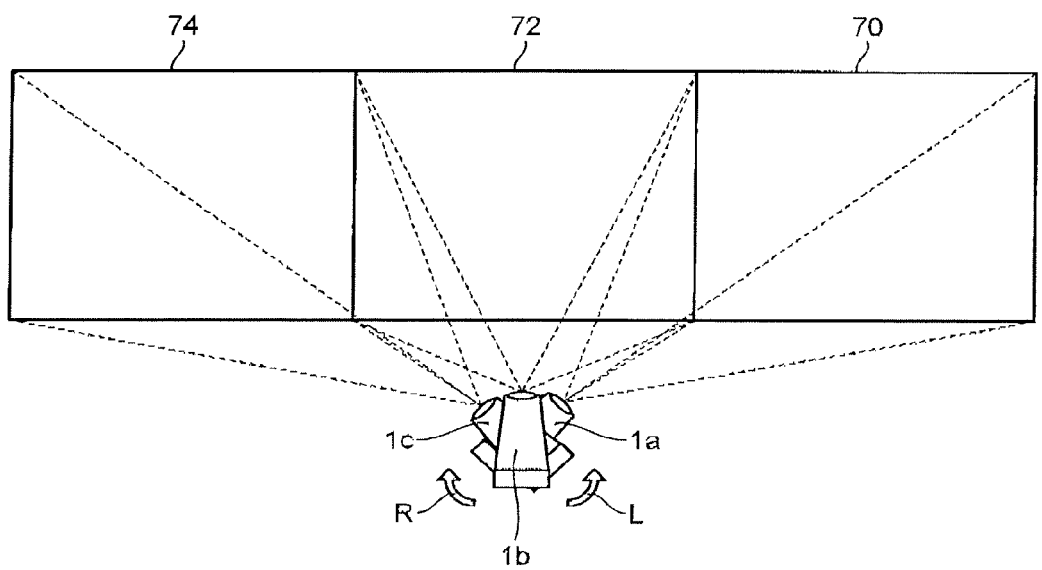
FIG. 6 is a diagram illustrating an example of relation between the attitude of the portable electronic device and a taken image.

Although the timing of imaging by the camera 38 with respect to the position of the housing 1C is not described in the example illustrated in FIG. 5, the imaging timing is not limited as long as images of desired regions can be obtained. An example thereof will be described below with reference to FIG. 6. FIG. 6 is a diagram illustrating an example of relation between the attitude of the portable electronic device and a taken image. Portable electronic devices 1a, 1b and 1c illustrated in FIG. 6 represent states in different orientations of one portable electronic device being rotated. First, the portable electronic device is placed at a position illustrated as the portable electronic device 1a as an initial position. The portable electronic device takes an image of an imaging region 70 in a state placed at the position represented as the portable electronic device 1a and then starts rotation of the housing. In the present embodiment, the housing is rotated in the direction of an arrow L.

Then, when the portable electronic device detects that the housing has moved to a position represented as the portable electronic device 1b on the basis of the detection results of the triaxial sensor 40, the portable electronic device takes an image of an imaging region 72 by the camera 38. The imaging region 72 is an imaging region with an end portion in the rotating direction adjacent to an end portion of the imaging region 70. In other words, the regions will become a continuous image when the images are integrated without any change.

Then, when the portable electronic device further rotates the housing and detects that the housing has moved to a position represented as the portable electronic device 1c on the basis of the detection results of the triaxial sensor 40, the portable electronic device takes an image of an imaging region 74 by the camera 38. The imaging region 74 is an imaging region with an end portion in the rotating direction adjacent to an end portion of the imaging region 72. In other words, the regions will become a continuous image when the images are integrated without any change.

As illustrated in FIG. 6, the portable electronic device can obtain a continuous image by taking an image when it is detected that an end portion of an imaging region has moved to a position overlapping with an end portion of an imaging region that has been imaged and integrating the end portion of the taken image with the end portion of the next taken image. As a result, it is possible to reduce processing of taken images and minimize the number of taken images.

While a panoramic image is generated by taking images a plurality of times while moving the housing and integrating the taken images in the embodiment described above, the present invention is not limited thereto. A plurality of taken images may be integrated under a predetermined condition. For example, images of 360° around the housing may be taken, face recognition processing may be performed on the taken image data, only regions of a set (registered) person may be extracted therefrom, and only images of the extracted regions may be integrated. In other words, only some imaging regions among taken images may be extracted and integrated. The extraction is not limited to extraction of a specific person but the extraction of images may be alternatively be made on the basis of determination on whether a person is present or not. Alternatively, the position of the housing may be automatically moved so that a specific person comes to the center of an imaging region. It may be designed such that images under a condition that is set to be unnecessary such as an image of only a wall are deleted.

While taken images are integrated on the basis of a predetermined condition in the embodiment described above, the present invention is not limited thereto. It may be determined whether to store images and whether to terminate taking images on the basis of the content of the taken images. Specifically, it may be designed such that images are taken while rotating the housing by the driving unit (vibration motor), and images from which a person is extracted are stored in the storage unit while the other images are deleted. It may also be designed such that images are taken while rotating the housing and taking the images may be terminated when a specific person (specific subject) is detected. For example, in a case where a group photograph is taken, a person at one end is specified in advance and imaging is started from the other end. Accordingly, the portable electronic device obtains images of people in the group while being rotated, and terminates taking images when the set person at the end is imaged. In this manner, all people in a group photo can be taken in one image. Alternatively, the number of people may be set instead of a specific person. It is also possible to automatically take an image of a specific person when it is desired to image the specific person. The specific subject is not limited to a person but can be a building or an object. For example, it may be designed to take an image when a name tag is detected so as to automatically photograph participants of a party. That is, the participants can be extracted and photographed without photographing staffs. It may also be designed such that only a person facing the portable electronic device is photographed.

Furthermore, movement of the housing and taking images by the camera may be controlled on the basis of sound information obtained by the main microphone 14 and the sub microphone 15. The control unit 22 can detect the direction from which sound is output (the direction where a person (speaker, output source of a voice) from whom a voice come from is present) by analyzing sound information obtained by each of the main microphone 14 and the sub microphone 15 provided at different positions in the second housing. The portable electronic device 1 can also function as a recording unit that records sound by storing information obtained by the main microphone 14 and the sub microphone 15 on the basis of control by the control unit 22. Specifically, the portable electronic device 1 can be a recording unit by combining the sound pickup function of the main microphone 14 and the sub microphone 15, the storage function of the storage unit 24 and the control function of the control unit 22.

The portable electronic device 1 rotates the housing 1C so that the imaging region of the camera 38 is oriented in a direction from which the detected sound comes from, and takes an image of the direction from which the sound comes from. In this manner, the portable electronic device 1 can automatically take images in directions from which sound comes from. Accordingly, it is possible to store an image of a speaker and sound in association with each other even when the portable electronic device 1 is used as a voice recorder, for example. In this manner, it is possible to determine more clearly who made statements. When a moving image is to be stored as images, it is possible to automatically take a moving image of speakers.

When the portable electronic device 1 is used as a video phone, it is also possible to display an appropriate image without adjusting the position of the portable electronic device 1 by the user by determining the position in which a speaker is present on the basis of sound information and automatically moving the housing 1C to the determined direction.

While the housing 1C is moved (rotated) to the direction from which sound comes from in the embodiment described above, the present invention is not limited thereto. For example, the image is first rotated by rotating the housing 1C to determine a position of a person. Then, for recording sound, that is, when the portable electronic device is used as a voice recorder, the image is not recorded and the sound and the direction from which the sound comes from are stored. Then, the direction from which the sound comes from and the position of the person first photographed may be associated with each other to determine the person who made a statement. If a speaker can be determined in this manner without an image at the time of making a statement, it becomes easier to identify the content of conversation and to prepare minutes of meetings. The portable electronic device 1 may also rotate the housing 1C to take an image of a direction where a speaker is present, compare the taken image with an image taken first and determine whether the identified persons are the same person. It may be designed to obtain another image if the persons are different persons.

Figure 7:
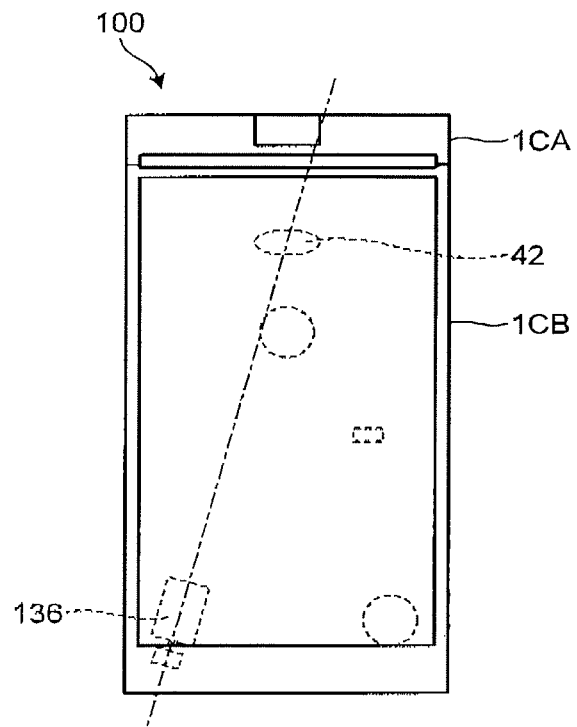
FIG. 7 is a plan view illustrating another embodiment of the portable electronic device.
Figure 8:
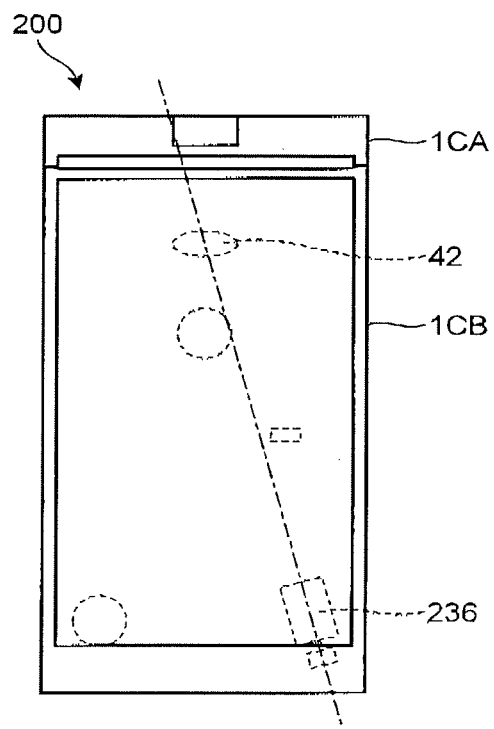
FIG. 8 is a plan view illustrating another embodiment of the portable electronic device.

The position of the vibration motor described above is not limited to that in the embodiment described above. Other examples of arrangement of the vibration motor 36 in the housing 1C will be described below with reference to FIGS. 7 and 8. FIGS. 7 and 8 are plan view illustrating other embodiments of the portable electronic device. The respective portable electronic devices illustrated in FIGS. 7 and 8 have the same configuration as the portable electronic device 1 illustrated in FIG. 1 except for the position of the vibration motor. The same components will therefore be designated by the same reference numerals, the description thereof will not be repeated, and features unique to the embodiments will be described below.

A portable electronic device 100 illustrated in FIG. 7 has a vibration motor 136 arranged at a position near an end portion opposite to the hinge 18 in the longitudinal direction of the back face of the second housing 1CB and nearer to one end portion (the end portion in the left in the drawing) in the short-side direction of the back face of the second housing 1CB. The vibration motor 136 is oriented in a direction in which an extension of the rotating shaft passes through the support 42.

Next, a portable electronic device 200 illustrated in FIG. 8 has a vibration motor 236 arranged at a position near an end portion opposite to the hinge 18 in the longitudinal direction of the back face of the second housing 1CB and nearer to the other end portion (the end portion in the right in the drawing) in the short-side direction of the back face of the second housing 1CB. The vibration motor 236 is oriented in a direction in which an extension of the rotating shaft passes through the support 42.

Even when the vibration motors 136 and 236 are arranged in positions that are not in the center in the short-side direction of the back face as in the portable electronic device 100 and 200, the housing 1C can be rotated about the support 42 by driving the vibration motors 136 and 236.

The vibration motor may be arranged in a direction in which an extension of the rotating shaft passes through the rotation center (such as the support) of the housing 1C, that is, in a direction perpendicular to the rotating direction of the rotating shaft as illustrated in FIGS. 7 and 8. As a result of providing the vibration motor so that the rotating shaft is oriented in the direction perpendicular to the rotating direction, the driving force generated by the vibration motor can be efficiently transmitted in the rotating direction to efficiently rotate the housing 1C. It is also possible to prevent the housing 1C from moving in a direction other than the rotating direction and to facilitate the control on the orientation of the housing 1C. Since the mounting position in the housing 1C can be set to any position only by adjusting the orientation of the rotating shaft, the flexibility of arrangement of components in the housing 1C can be increased.

The support and the vibration motor may be arranged in a positional relation in which the center of gravity of the housing (portable electronic device) 1C is between the support and the vibration motor. As a result of arranging the center of gravity between the support and the vibration motor, it is possible to efficiently transmit the driving force (rotating force) generated by the vibration motor with respect to the contact area and to efficiently rotate the housing 1C.

While the support is arranged at a position near the camera of the portable electronic device and the vibration motor that is a driving unit is arranged at a position away from the camera in all of the embodiments described above, the positions may be reversed. Specifically, the driving unit may be arranged at a position near the camera and the support may be arranged at a position away from the camera. Even with this configuration, the support is the rotating center of the housing, and the imaging region of the camera can be changed by rotating the housing.

While the vibration motor 36 that vibrates the housing 1C is used as a moving mechanism (drive source) for rotating the housing 1C, the moving mechanism for rotating the housing 1C is not limited thereto. A combination of a wheel and a drive source for rotating the wheel, for example, can be used as the moving mechanism.

While the portable electronic device 1 according to the embodiments described above moves the housing only in the rotating direction by the driving unit, the present invention is not limited thereto. The driving unit may move the housing in a direction other than the rotating direction. For example, a plurality of vibration motors may be mounted as a moving mechanism (a displacing unit, a moving unit) in the housing of the portable electronic device and the control unit may control the rotation of one or more of the vibration motors so that the housing is subjected to parallel movement, rotational movement, zigzag movement and the like. As a result of allowing movement other than in the rotating direction, the housing can be moved to a desired position in a desired direction, and the direction and the position in which images are taken by the camera can be more precisely and appropriately adjusted.

In the embodiments described above, the vibration motor 36 is used for both applications of incoming call informing means and a drive source (moving mechanism). It is therefore possible to reverse, that is, switch the rotating direction of the rotating shaft at constant intervals when the vibration motor 36 is used as the incoming call informing means. Switching of the rotating direction in this manner allows informing of incoming calls while suppressing the rotating amount of the housing 1C, that is, while preventing the attitude of the housing 1C from changing by a predetermined angle or larger.

INDUSTRIAL APPLICABILITY

A portable electronic device according to the present invention is useful for a device having an imaging function.

The invention claimed is:

1. A portable electronic device comprising:
an imaging unit for imaging a subject in an imaging region;
a moving unit for changing orientation and/or a position of the portable electronic device; and
a control unit for causing the moving unit to change the orientation and/or the position of the portable electronic device so as to move the imaging region of the imaging unit, wherein
the moving unit is configured to rotate the portable electronic device around a rotary axis along a direction perpendicular to a surface on which the portable electronic device is placed, wherein
the moving unit is configured to drive a rotor to rotate the portable electronic device, and wherein
the moving unit serves as an informing unit for performing information by driving the rotor to vibrate the portable electronic device, and
the control unit is configured to cause the moving unit to switch rotating direction of the rotor when the moving unit serves as the informing unit.

2. The portable electronic device according to claim 1, further comprising a communication unit for communicating with another device, wherein
the control unit is configured to cause the moving unit to drive the rotor when an incoming call is received by the communication unit.

3. The portable electronic device according to claim 1, further comprising:
a housing having a face to be opposed to the surface on which the portable electronic device is place; and
a projecting portion that projects from the face and serves as a center of rotation when the portable electronic device housing is rotated.

4. The portable electronic device according to claim 3, further comprising a sound emitting unit for outputting sound, the sound emitting unit being arranged at a position facing a space between the surface on which the portable electronic device is placed and the face.

5. The portable electronic device according to claim 1, further comprising an attitude detecting sensor for detecting an attitude of the portable electronic device, wherein
the control unit is configured to control the moving unit to change the orientation and/or the position of the portable electronic device on the basis of the attitude of the portable electronic device detected by the attitude detecting sensor.

6. The portable electronic device according to claim 1, wherein
the control unit is configured to cause the imaging unit to image a
plurality of images while causing the moving unit to rotate the portable electronic device, and to combine the taken images to obtain an image wider than the imaging region.

7. The portable electronic device according to claim 1, further comprising a storage unit for storing an image taken by the imaging unit, wherein
the control unit is configured to extract a subject from the image taken by the imaging unit, and to store the image taken by the imaging unit when the predetermined specific subject is extracted from the image.

8. The portable electronic device according to claim 7, wherein
the control unit is configure to control the moving unit to change the orientation and/or the position of the portable electronic device on the basis of a position of the specific subject in the imaging region.

9. The portable electronic device according to claim 1, wherein
the control unit is configure to control the moving unit to change the orientation and/or the position of the portable electronic device such that an image of a region satisfying a predetermined condition is taken.

10. The portable electronic device according to claim 1, further comprising a microphone for obtaining sound, wherein
the control unit is configure to control the moving unit to change the orientation and/or the position of the portable electronic such that an image of a region from which the sound is emitted is taken.

* * * * *